United States Patent Office 3,435,704
Patented Apr. 1, 1969

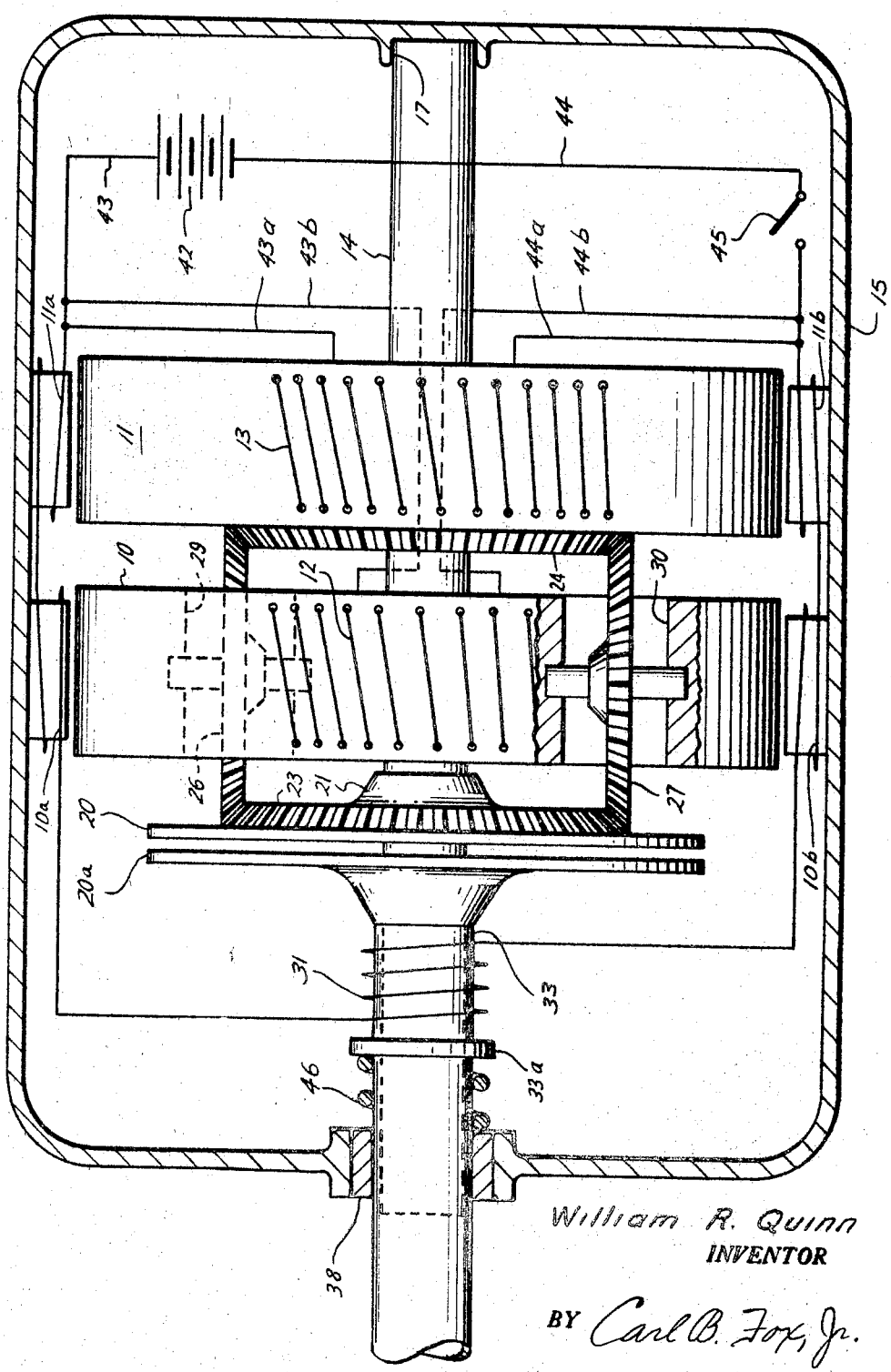

3,435,704
REACTION-FREE ROTARY DRIVE
William R. Quinn, 5628 Brock, Houston, Tex. 77023
Filed Jan. 27, 1967, Ser. No. 612,176
Int. Cl. G05g 3/00
U.S. Cl. 74—572     7 Claims

ABSTRACT OF THE DISCLOSURE

This disclosure is of a reaction-free rotary drive, that is, a drive mechanism wherein there is no reactionary secondary rotation or torque produced by the primary rotation or torque of the drive and its components. The drive components when in operation do not produce counter rotation of any part of the apparatus, so that the drive apparatus will function in non-gravitational areas, such as in space, without producing counter rotation of the support for or holder of the apparatus.

---

The invention pertains to the field of arts relating to reaction-free or non-counter rotational drive systems. The apparatus according to the invention is adapted to transmit torque to exterior devices, i.e. a workpiece, with no resultant torque being imparted to the support for or holder of the drive assembly when the torque is delivered to the separate exterior device.

Prior to the advent of the space age, about the only problem of any importance relating to reaction-free or non-counter rotational drive mechanisms was that encountered in the case of aircraft of the helicopter type. Since helicopters when aloft in the atmosphere are in relatively unsupported condition, provision must be made to prevent counter rotation of the aircraft in response to the rotor or blade. Rarely if ever has it heretofore been necessary to utilize non-counter rotational principles in connection with tools and other apparatuses, since such were always in some manner supported by the earth or some structure connected to the earth so that the counter rotational problems did not exist to a serious degree.

BRIEF SUMMARY OF THE INVENTION

The apparatus afforded according to this invention includes electric motor apparatus wherein, instead of a single armature, two counter rotating armatures are provided. Each armature is caused to rotate by electromagnets suitably disposed at the periphery of the armature, as in the case of ordinary electric motors. Cutting of the magnetic lines of force by the current-carrying armature wires causes rotation of each armature. This operation is very well known in the arts pertaining to electric motors, generators, and the like.

Although the armatures may be made to rotate continuously, by continuous passage of current through the magnet coils and through the armature wiring, if any, if this were done and the apparatus were engaged with a workpiece, counter rotation would result at the drive because of the engagement of the drive with the workpiece.

This type of counter rotation is avoided, however, by alternate energization and non-energization of the magnet and armature elements, if present, and utilization of only the stored energy of the armatures to perform the work on the workpiece. The armatures are free rotating, without torque transferring connection to the housing of the drive assembly, so that there is no resultant counter rotation or reactionary torque to the support or holder of the drive apparatus. In other words, the armatures are made to rotate in opposite directions from each other by electrical forces, then are de-energized and their momentum used to perform the desired work on a workpiece.

Drive apparatuses of the nature described may be utilized in plural units so as to provide continuous impartation of torque at the workpiece. However, for most applications, it will suffice to use only one drive apparatus with the frequency of energization and de-energization so rapid as to produce, in effect, continuous supply of torque at the portion of the drive engaging the workpiece.

Utilization of the apparatus afforded according to this invention will enable the performance of work by space men freely floating in space, without any reaction-torque being imparted to the space man who is holding the drive apparatus for performance of the work.

BRIEF DESCRIPTION OF THE DRAWING

The single drawing figure is an elevational view, partly schematic and partly in vertical cross section, showing a preferred form of reaction-free drive according to the invention.

DESCRIPTION OF THE PREFERRED EMBODIMENT

Referring now to the drawing in detail, the preferred embodiment of reaction-free rotary drive therein shown includes a pair of rotatable armatures 10, 11. These armatures may be properly also described as flywheels, since stored rotational energy thereof is employed to perform work on exterior separate workpieces. As indicated schematically, each armature or flywheel 10, 11, may have electrical windings or conductors 12, 13 respectively, which may be of any form known in the art. Various forms of armature windings are available and any of such may be used in apparatuses made according to this invention. The armature may, for example, be of the Gramme ring winding type, of the lap or multiple winding type, of the wave winding type, or of any other suitable type of known armature winding.

The showing in the drawing of armatures having windings is not intended to be in limitation of the invention. The essential consideration is that the armatures be impelled to rotate in opposite directions. For this, any type of electric motor drive known in the art may be employed. Although a battery (or batteries) is shown as a source of DC power, it will be understood that AC systems may be also be used. In connection with operations at a space capsule, for example, the torque-free drive could be used inside or outside the capsule with a power conduit, AC or DC, leading to the drive. AC induction types of armature rotation, wherein the armatures have no windings, may be employed, as well as all other types known in the art.

Armatures 10, 11 are each mounted for free rotation on shaft 14, which is a fixed shaft which does not rotate. The armatures are not necessarily disposed to rotate about a common axis, although this arrangement is preferable. They may be made to rotate about parallel axes. Use of suitable bearings, not shown, between the shaft and armatures is to be preferred, in order to eliminate friction. Shaft 14 is fixed at one end to the housing 15 which encloses the moving parts of the apparatus, the housing having inwardly facing socket 17 into which the shaft end is inserted and fixed in place, for example, by welding or the like. The housing 15 may be of any shape suitable for enclosing and protecting the apparatus.

A circular clutch plate 20 is mounted at its hub 21, with provision of suitable bearings (not shown), to be rotatable freely on fixed shaft 14. Clutch plate 20 carries at one face concentric beveled ring gear 23. An identical or similar concentrically disposed circular beveled ring gear 24 is carried at the side of armature 11 toward armature 10. A pair of oppositely disposed circular beveled gears 26, 27 are mounted for rotation within openings 29, 30, respectively, through armature 10, the openings and gears being balanced both as to dimensions and weights so that no counter rotation of the drive assembly results from their operation. Passages 29 and 30 are of equal size and are balanced at opposite sides of shaft 14 so that no eccentric effect on the armature results therefrom. Any balanced gear system may be used. Likewise, the gears 26, 27 are of equal size and weight and rotate in opposite directions so that no eccentricities or counterrotational effects result therefrom. Opposite sides of each of the gears 26, 27 are engaged with opposite sides of each of the gears 23, 24. It will be readily seen that armatures 10, 11, when caused to rotate in opposite directions by electrical energizations of the field coils 10a, 10b, 11a, 11b and the armature windings, if present, will through gears 26, 27, 24, result in rotation of gear 23 and circular clutch plate 20. Clutch plate 20 rotates in the same direction as armature 10, and the opposite direction from the rotation of armature 11.

During the time that armatures 10, 11 are impelled to rotate in opposite directions by electrical energization of the field coils 10a, 10b, 11a, 11b and the armature windings, clutch plate 20 is not engaged by second clutch plate 20a which is held in released position by electrical current energization of magnetic clutch coil 31. When the electrical current is discontinued, the field coils and armature windings, if present, are de-energized, and the magnetic clutch coil is de-energized as well.

Clutch plate 20a is concentrically carried on rotating sleeve 33 which is disposed for free rotation about shaft 14. The clutch coil 31 is disposed around sleeve 33. Shaft or sleeve 33 extends from housing 15 through bearing 38. The other end of sleeve 33 may be provided with a tool or other device for performing work on an exterior workpiece.

A battery 42 is shown mounted within housing 15 and conductors 43, 44 extend from the opposite battery terminals to the field coils, armature windings, and the magnetic clutch coil. As mentioned above, AC power may alternatively be employed. A switch 45 disposed in series in conductor 44 is closed to provide energization of the coils and windings, and is opened to terminate such energization.

Conductors 43a, 44a provide for current flow through armature winding 13, and conductors 43b, 44b provide for current flow through armature winding 12. Brush-commutator connections for the windings to the conductors are provided if needed, as is standard in the art so that no showings or description thereof is believed necessary. Any suitable form of armatures, with or without armature windings, may be employed in connection with this invention.

In order that counter rotation, or reactionary torque, will not result from operation and use of the rotary drive apparatus, the weights and effective torques of the rotating components are balanced. The weight or mass of armature 11 is counter balanced against the weights or masses of armature 10 and clutch plate 20 with its hub 21 during rotation so that equal and opposite torques occur which cancel one another so that there is no reactant torque on shaft 14 and housing 15, nor on any other components, during energized or de-energized rotations of the armatures and connected parts. When switch 45 is opened, clutch plates 20a is free to move to bear against and frictionally engage clutch plate 20, and stored rotational energy of both armatures, or flywheels, is imparted to sleeve 33 to enable the tool or other device at the other end of sleeve 33 to engage a workpiece to do work thereon.

A compression spring 46 engaged between the housing and/or bearing 38 and boss or flange 33a of sleeve 33 maintains the clutch in engaged condition when the energization of magnetic clutch coil 31 is interrupted.

During the time that the stored armature or flywheel energy is being transferred to shaft 33 to do work, all of the elements which rotate are freely rotating with respect to shaft 14 so that no torque is imparted to the housing and other remaining portions of the overall apparatus.

Energization and de-energization may occur at rapid intervals in order that the work-doing rotation of shaft 33 may be substantially continuous. Switch 45 may, therefore, be a device which automatically causes rapid alternate energizations and de-energizations of the coils and windings. Many such devices are well known in the art. A second, or plural, rotary drive apparatuses may be provided, alternate impartations of rotation from each unit occurring sequentially. Plural armatures for rotation in each direction may be mounted on one shaft.

The apparatus herein disclosed will find extensive use in applications where counter rotation of the drive is not desirable, as in space and in any other similar conditions.

While a preferred embodiment of the invention has been shown and described, many modifications thereof may be made by a person skilled in the art without departing from the spirit of the invention, and it is intended to protect by Letters Patent all forms of the invention falling within the scope of the following claims.

I claim:

1. Reaction-free rotary drive, comprising first and second armature means, fixed shaft means having said first and second armature means mounted thereon whereby said armature means are freely rotatable, gear means connecting said first and second armature means for rotation in opposite directions, electrical means for driving said first and second armature means to rotate in said opposite directions, means for electrically energizing and de-energizing said electrical means, and means releasably engaging at least one of said armature means to be rotated thereby and to deliver said rotation to a workpiece, said means releasably engaging at least one of said armature means being engaged when said electrical means is not driving said armature means and not being engaged when said electrical means is driving said armature means, whereby stored rotational energy of said armature means is delivered to said means releasably engaging at least one of said armature means only when said electrical means is not driving said armature means and said armature means are freely rotating in opposite directions to function as flywheels.

2. The combination of claim 1, said electrical means comprising electric power source means and field coil means adjacent said armature means and switch means for causing energization ad de-eergization of said field coil means by said electric power source means, whereby each said armature means is driven to rotate in the manner of an electric motor.

3. The combination of claim 2, said means releasably engaging at least one of said armature means comprising clutch means releasably engaging a clutch plate rotated by said gear means.

4. The combination of claim 3, said clutch means comprising a spring-biased solenoid actuated clutch, the spring-bias thereof causing said clutch to be engaged and the solenoid thereof causing said clutch to be disengaged, said solenoid being energized by said electric power source means to disengage the clutch only when said armature means are being driven as described.

5. The combination of claim 4, said clutch being carried on a sleeve disposed for free rotation about the shaft of the engaged armature means.

6. The combination of claim 5, said first and second armature means and said sleeve being freely rotatable on a single fixed shaft forming said shaft means.

7. The combination of claim 6, including housing means supporting said single fixed shaft and said sleeve, the other described elements being disposed within said housing means.

References Cited

UNITED STATES PATENTS

| | | | |
|---|---|---|---|
| 2,484,364 | 10/1949 | Whitledge | 173—93.6 XR |
| 2,931,928 | 4/1960 | Fehn | 310—74 XR |
| 3,128,400 | 4/1964 | Hornschuch et al. | 173—93.6 |
| 3,294,183 | 12/1966 | Riley et al. | 173—162 |
| 3,321,650 | 5/1967 | Pedone et al. | 310—68 XR |

FRED C. MATTERN, JR., *Primary Examiner.*

JAMES A. WONG, *Assistant Examiner.*

U.S. Cl. X.R.

310—50, 68